Patented May 17, 1927.

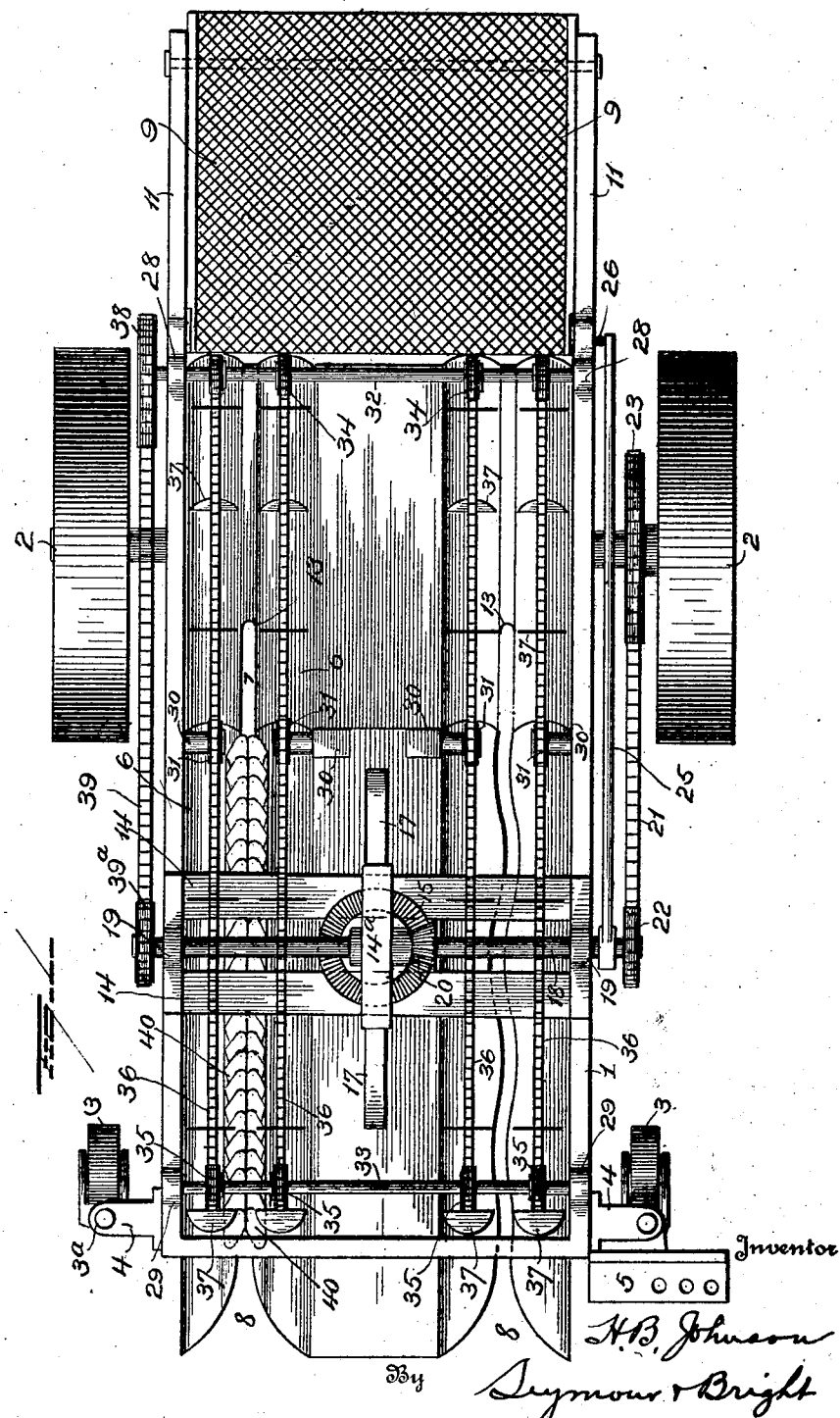

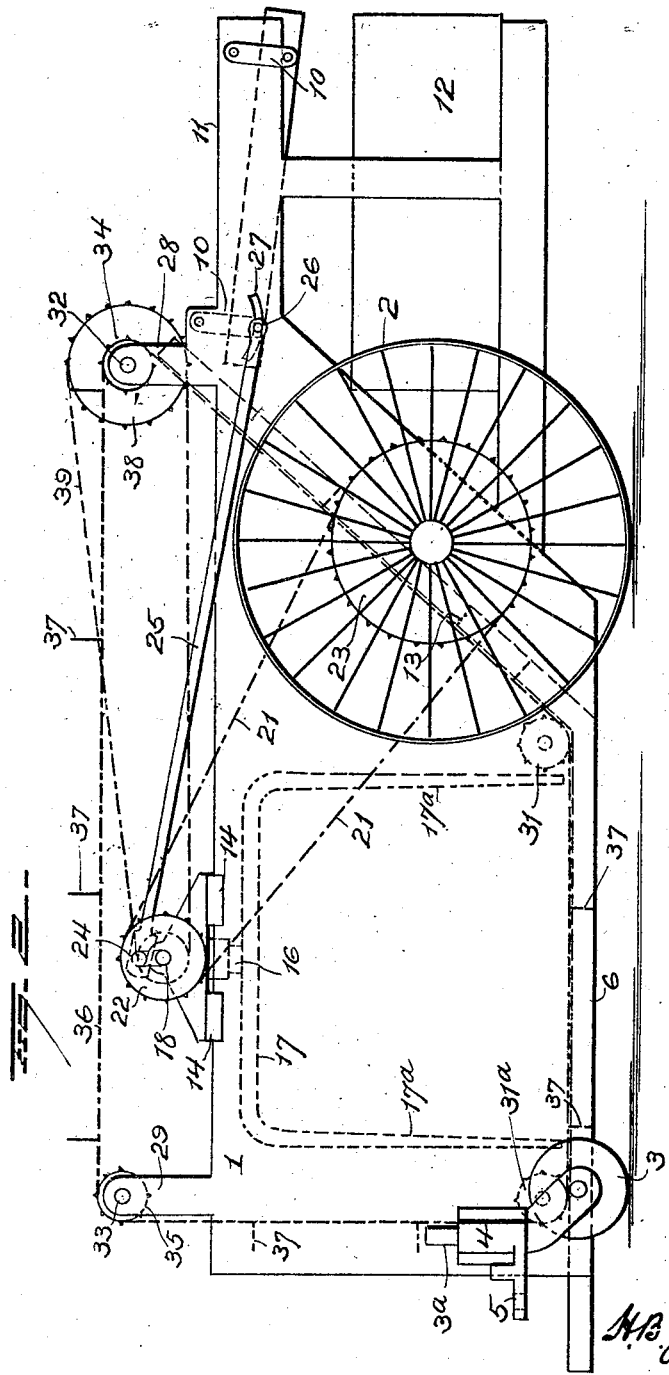

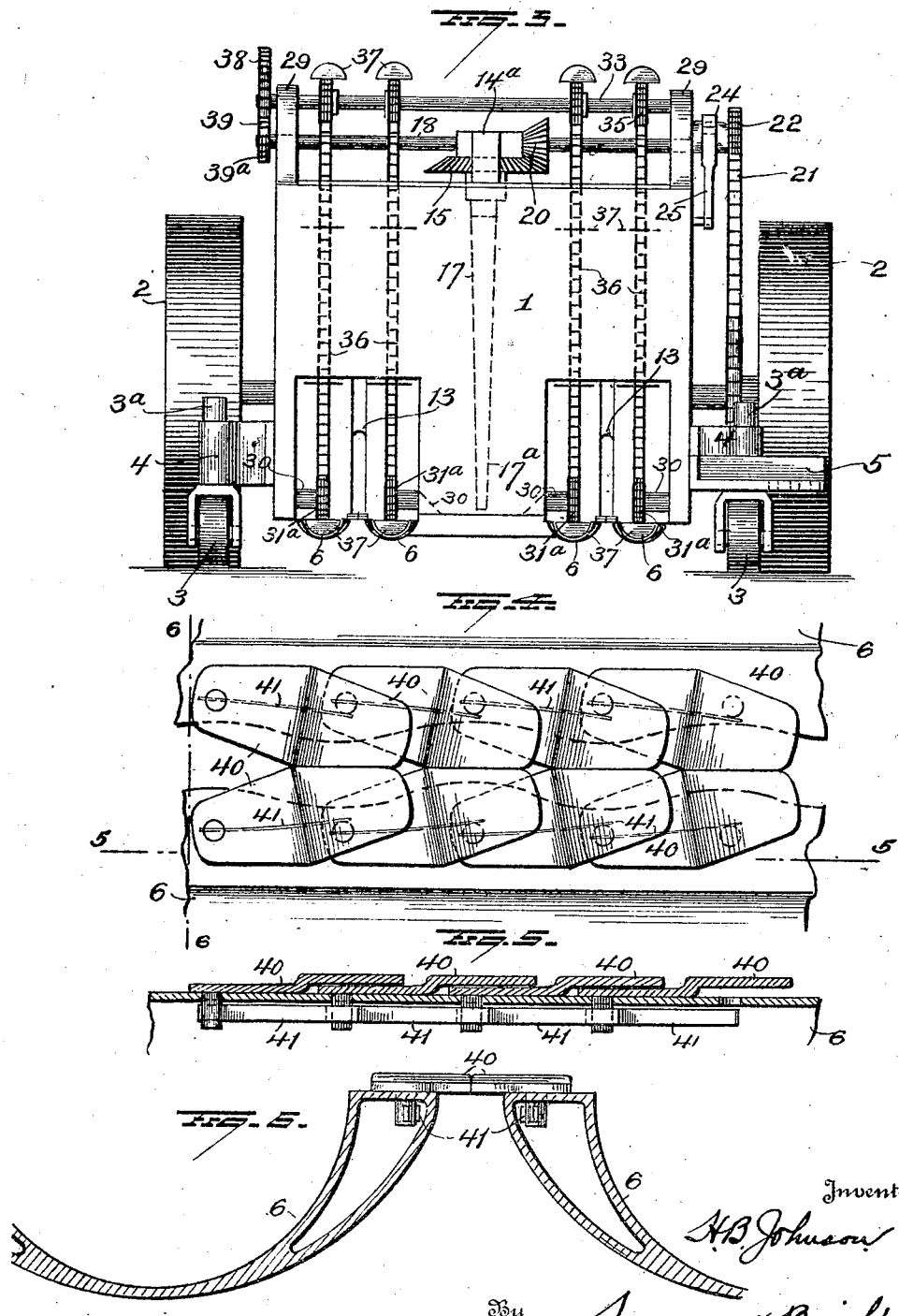

1,629,215

UNITED STATES PATENT OFFICE.

HOMER B. JOHNSON, OF SHERIDAN, INDIANA; EMMA K. JOHNSON ADMINISTRATRIX OF SAID HOMER B. JOHNSON, DECEASED.

HARVESTER.

Application filed September 1, 1922. Serial No. 585,757.

This invention relates to improvements in harvesters and more particularly to such as are adapted for use in harvesting beans,—one object of the invention being to so construct a bean harvester that the beater arms may reach close to the ground and so that each beater arm shall strike the plants in each of two or more rows and on each side of each plant so as to insure the gathering of all the beans which the plants may contain.

A further object is to construct a harvesting machine in such manner that all the beans removed from the plants shall be conveyed to a place of deposit and to so construct and arrange the endless conveying means that after passing through troughs from front to rear of the machine, the returning portions of such conveying means shall be so disposed as to prevent the same from carrying material toward the front of the machine, and so that the rearwardly moving portions of the said conveying means may be disposed below the path of movement of the lower extremities of the beater arms.

A further object is to so construct the machine that the plants will be moved laterally in alternately opposite directions as the machine moves forwardly whereby the branches and pods will be presented in different positions to the action of the beater arms or fingers to insure a more complete gathering of the beans.

A further object is to provide simple and efficient means permitting the automatic opening and closing of the slot for the accommodation of the plants as the machine moves forwardly, and thus reduce to a minimum the loss of beans during the harvesting of the same.

With these and other objects in view, the invention consists in certain novel features of construction and combinations of parts as hereinafter set forth and pointed out in the claims.

In the accompanying drawings; Figure 1 is a plan view of a harvester showing an embodiment of my invention; Figure 2 is a side elevation; Figure 3 is a front end view; Figure 4 is an enlarged detail plan view of the shutters; Figure 5 is a section on the line 5—5 of Fig. 4; Figure 6 is a section on the line 6—6 of Fig. 4.

The main frame or casing 1 of the machine (preferably closed at its sides and forward end) is suitably mounted on rear traction wheels 2 and on comparatively small forward wheels 3, the vertical axles 3ª of which are mounted to castor in suitable brackets 4 projecting laterally from the forward end portion of the frame. One of the lateral brackets 4 may be provided with a clevis 5 for connection of suitable draft means.

The machine as shown in the drawing is adapted to operate on two rows of plants simultaneously, but it is evident that it may be built to operate on a greater or less number of rows.

In the embodiment of the invention which I have illustrated, two troughs 6, 6 are located near each side of the framework, and the troughs of each pair are so spaced apart as to provide a slot 7 between them for the accommodation of plants as the machine moves forwardly. The forward end portions of the troughs of each pair are formed to produce flaring mouth portions 8 for properly directing the plants to the slots 7 and the inner edge portions of the troughs of each pair are made undulatory throughout portions of their lengths so that the slots between the troughs will be wave-like and cause the plants to be moved sidewise, alternately in opposite directions, and thus insure the presentation of all the branches and pods to the action of beater arms or fingers hereinafter described.

The forward horizontal portions of the troughs are so located that they will be disposed comparatively close to the ground, while their rear portions extend diagonally upward so that they may discharge onto a shaking screen 9 suspended by means of pivoted links 10 in a rearward extension 11 of the framework, said screen being located over a receptacle 12 supported in the rear frame extension 11. The slots 7 between the troughs of the respective pairs extend throughout the horizontal portions of the troughs and between the rear inclined portions of said troughs to a height sufficient to permit the passage of the machine over the stripped plants, such height of the slots being indicated at 13.

The framework is provided at its upper intermediate portion with parallel cross bars 14 which are spaced apart and serve to support a centrally located bracket 14ª, and the latter affords a mounting for a horizontal beveled gear 15, to which a shank 16 at the upper end of a beater 17 is secured. This beater, which is rotatable on a vertical axis, comprises two vertically disposed beater arms 17ª which extend approximately to the horizontal plane of the upper edges of the horizontal portions of the troughs, and said beater arms are so spaced apart that they will have such sweep (when the beater is rotated) that they will operate to strike the plants in each row and cause the beans to be removed therefrom and become deposited in the troughs. The central bracket 14ª also serves to provide a central bearing for a transverse shaft 18, the end portions of which are mounted in brackets 19 at respective ends of the cross bars 14. A bevel pinion 20 secured to the shaft 18 transmits motion to the gear 15 for rotating the beater and said shaft is driven by a sprocket chain 21 passing over a sprocket 22 on said shaft and a larger sprocket 23 carried by one of the traction wheels.

A crank or eccentric may be provided at 24 on the shaft 18 and serves to impart reciprocatory motion to the shaking screen, through the medium of a pitman 25, the rear end of which may be connected with a pin 26 projecting from said screen and passing through an elongated slot 27 in one side of the rear portion of the framework.

Standards 28, 28 project upwardly from the rear portion of the framework, and similar standards 29 project upwardly from the forward portion of said framework. At the junctures of the inclined portions of the troughs with the horizontal portions thereof, brackets 30 are located and provide mountings for idle sprocket wheels 31. Forward sprocket wheels are located at 31ª a transverse shaft 32 is mounted in the rear upwardly projecting standards 28 and a similar transverse shaft 33 is mounted in the forward upwardly projecting standards 29. These shafts carry sprocket wheels 34 and 35 so positioned as to accommodate sprocket chains 36 which are disposed over the several troughs and carry drags 37 movable through said troughs and curved to conform approximately to the transverse contour of the latter. It will readily be seen that the drag chains constitute conveying means and that they may travel rearwardly through the horizontal portions of the troughs, then upwardly through the inclined portions of the troughs, causing the contents of the latter to be discharged onto the shaking screen,—and then return forwardly over the upper portion of the framework where they will not be liable to drag débris forwardly.

With the construction of conveying means and bearing means hereinafter described, the interior of the machine will be kept clear of branches and other débris and the clogging of the beater or of other parts of the mechanism will be effectually avoided.

Power for driving the several drag or conveyor chains may be transmitted to sprocket wheel 38 on the shaft 32 by a drive chain 39, from a smaller sprocket wheel 39ª on the shaft 18.

For the purpose of reducing to a minimum the loss of beans through the slots 7, I provide means operable automatically to permit passage of plants through said slots in the bottom of the harvester and then to close the slots, such action taking place progressively as the machine moves forwardly over a plant. In the embodiment of the invention shown in the drawings, the automatic slot closing means comprises, for each slot, pairs of shutters 40, 40 pivoted to the troughs at respective sides of the slot. Each shutter is so formed as to taper somewhat from the center to respective ends and the straight inner edges of the rear tapering portions of the shutters of each pair are caused to abut centrally over the slots, by the action of springs 41. The shutters are so arranged that the rear portions of one pair will overlap the forward portions of the next succeeding pair and to facilitate this, the rear portions are offset with respect to the forward portions as clearly shown in Figure 5. In the construction shown in the drawings, flat springs 41 are employed to operate the shutters, said springs being secured to the pivot pins at the forward ends of the shutters and bearing against the pivot pins of the next succeeding pair.

Slight changes might be made in the details of construction of my invention without departing from the spirit thereof or limiting its scope and hence I do not restrict myself to the precise details herein set forth.

Having fully described my invention what I claim as new and desire to secure by Letters-Patent, is:—

1. In a bean harvester, the combination with the framework, of a pair of troughs spaced apart and forming a sinuous slot between them, portions of said troughs lying horizontally near the bottom of the machine and the rear portions of said troughs being inclined, means located over the plane of the horizontal portions of said troughs for driving the beans from the plants in lateral directions to each side of said plants, and conveyors having drags movable through said troughs from front to rear.

2. In a harvester, the combination with framework, of a pair of troughs spaced apart and forming a slot between them, portions of said troughs lying horizontally at the bottom of the machine and the rear portions of said troughs being inclined, a beater over the plane of the horizontal portions of said troughs, conveyors having drags passing through said troughs from front to rear and returning to the front of the machine adjacent to the top of the framework, and means for operating the conveyors and the beater.

3. In a harvester, the combination with a framework, wheels on which the framework is mounted, and a screen at the rear end of the framework, of pairs of troughs having horizontal portions at the bottom of the framework and rear inclined portions to discharge onto said screen, the troughs of each pair being spaced apart and forming a slot between them, a conveyor chain over each trough and provided with drags conforming approximately to the cross section of each trough, sprocket wheels at the lower portion and the upper portion of the framework for said chains, whereby said chains may pass rearwardly over the trough and return to the front end of the framework near the top of the latter, a beater over the plane of the horizontal portions of the troughs, and means for operating said conveyor chains and said beater.

4. In a harvester, the combination with framework, and a pair of troughs spaced apart forming a slot between them, of a plurality of pairs of overlying spring pressed shutters normally closing said slot.

5. In a harvester, the combination with a pair of troughs spaced apart forming a slot between them, of a plurality of pairs of overlapping shutters, each tapering from its center toward both ends and having straight side edges, said shutters being pivotally connected with the troughs, and springs cooperating with said shutters whereby the rear straight edges of the shutters of each pair are caused to abut to normally close the slot.

6. In a harvester, the combination with a framework, of a pair of troughs spaced apart forming a slot between them, the adjacent side portions of the respective troughs being undulatory in form, whereby the slot formed by said side portions of the troughs will have an undulatory or wave-like form.

7. In a harvester, the combination with a framework, carrying wheels on which the framework is mounted, a shaking screen at the rear portion of said framework, troughs spaced apart forming slots, said troughs having horizontal portions and also having rear inclined portions to discharge onto said shaking screen, transverse shafts mounted over the framework near respective ends thereof, sprocket wheels on said shafts, sprocket wheels in the lower portion of the framework, conveyor chains passing over said upper and lower sprocket wheels and carrying drags movable in said troughs, an intermediate transverse shaft mounted near the top of the framework, gearing between one of the carrying wheels and said intermediate shaft, crank-and-pitman means between said intermediate shaft and the shaking screen, and gearing between said intermediate shaft and one of the first-mentioned transverse shafts.

In testimony whereof, I have signed this specification.

HOMER B. JOHNSON.